United States Patent [19]

Peruzzi

[11] 4,412,699
[45] Nov. 1, 1983

[54] MODULAR FRAME FOR TIPPING BODIES OF TRUCKS ADJUSTABLE IN WIDTH

[75] Inventor: Luigi Peruzzi, Rome, Italy

[73] Assignee: Officine Romanazzi S.p.A., Rome, Italy

[21] Appl. No.: 272,409

[22] Filed: Jun. 10, 1981

[30] Foreign Application Priority Data

Aug. 13, 1980 [IT] Italy .................. 49490 A/80

[51] Int. Cl.³ .................. B60P 1/28; B62D 21/12
[52] U.S. Cl. .................. 298/17.7; 280/656; 298/17 R; 298/22 R
[58] Field of Search .......... 298/17 R, 17.6, 17.7, 298/22 R, 19 R; 296/26, 184; 280/656, 789

[56] References Cited

U.S. PATENT DOCUMENTS

| | | | |
|---|---|---|---|
| 1,393,169 | 10/1921 | Schlatter et al. | 298/17.7 |
| 2,162,831 | 6/1939 | Barrett | 298/22 R |
| 2,640,725 | 6/1953 | Dale | 298/17 R |
| 2,801,864 | 8/1957 | Raney et al. | 280/656 X |

FOREIGN PATENT DOCUMENTS

| | | | |
|---|---|---|---|
| 214108 | 3/1958 | Australia | 297/17.7 |
| 700244 | 12/1930 | France | 298/22 R |
| 308990 | 3/1969 | Sweden | 298/17.6 |

Primary Examiner—Leslie J. Paperner
Attorney, Agent, or Firm—Pollock, Vande Sande & Priddy

[57] ABSTRACT

A modular frame for width-adjustable tipping bodies for dump trucks, comprising a pair of cross members, having at their ends the peripheral tipping joints of the body, and a pair of parallel side members, symmetrical in respect of the longitudinal axis of the vehicle, connected with said cross members, and the base of the telescopic jack, and being provided with means for the adjustment of the center distance of said side members to the transverse dimensions of the original frame of the vehicle.

3 Claims, 6 Drawing Figures

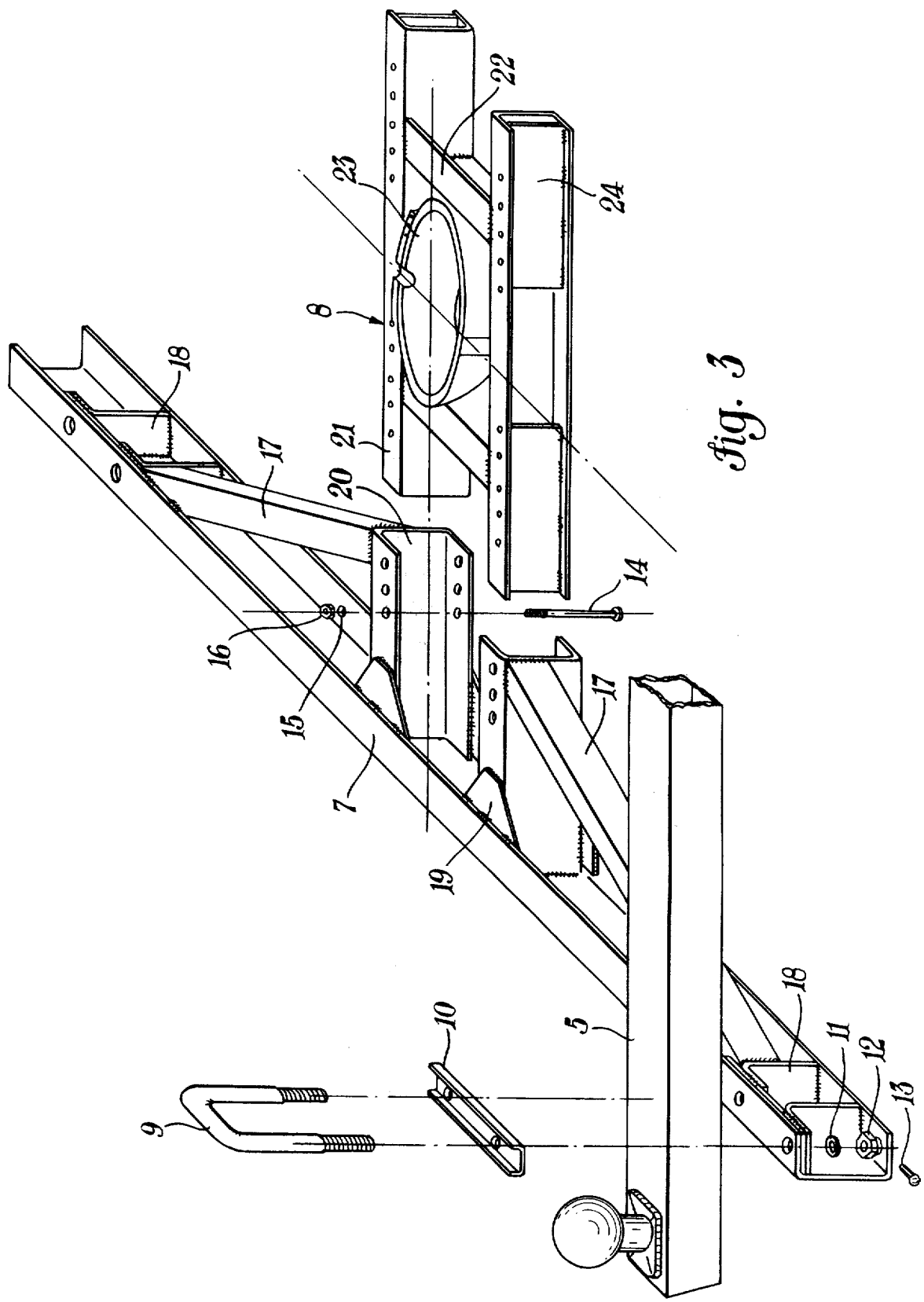

MODULAR FRAME FOR TIPPING BODIES OF TRUCKS ADJUSTABLE IN WIDTH

The present invention has as its object an auxiliary modular frame for tipping, width adjustable, for mounting on dump trucks or the like.

It is known that, for mounting a tipping body on a truck, it is necessary to build an auxiliary frame which supports the body in the tipping phases, and which constitutes a connection member with the truck frame, for which the change of the truck varies consequently to the auxiliary frame.

This entails many difficulties in mass production, for the same type of tipping body, it is necessary to provide many types of auxiliary frames, thus differentiating the end product.

The purpose of the invention is to eliminate said differentiation, providing an auxiliary modular frame that can be mounted on all types of trucks. In other words, custom built auxiliary frames and extensive parts inventories are no longer required.

According to the invention, an auxiliary frame is built in such a way as to permit adjustment of the distance between the centers of its side members, from a minimum to a maximum, which permits the application on all truck frames comprised in the range of the tipping body itself.

Said auxiliary modular frame is constituted by two C-shaped side members, on which, in the fastening area of the arms carrying hinging spherical joints, there are welded L-shaped reinforcement members provided with holes coaxial with holes in the upper surfaces of the C-shaped members, and in the central area of which are welded two half crossmembers with holes, reinforced by gussets which are connected with the whole of the base of a telescopic jack by means of fastening bolts. Said base is composed of two drilled cross members joined by an omega-shaped cap on which is welded the spherical slot which houses the telescopic jack, the drilling of the cross members being executed in such a way as to allow the variations in width from a minimum to a maximum.

The hinging spherical joint arms are constituted of a tubular channel being idoneous to support the load of the body, and of two sphere supports, which, when connected with the relative seats fixed on the tipping body, enable the tipping.

The hinging spherical joint arms are fastened to the side members by means of an upside-down U-shaped threaded bracket with interposed shim bolt and notch threaded nuts, which, after being tightened with the exact preloading, are fastened with a safety split pin.

The invention will now be described with reference to the accompanying drawings, showing an embodiment of the invention for purposes of illustration.

FIG. 3 is a perspective view of half the unmounted auxiliary frame.

Figure 1:
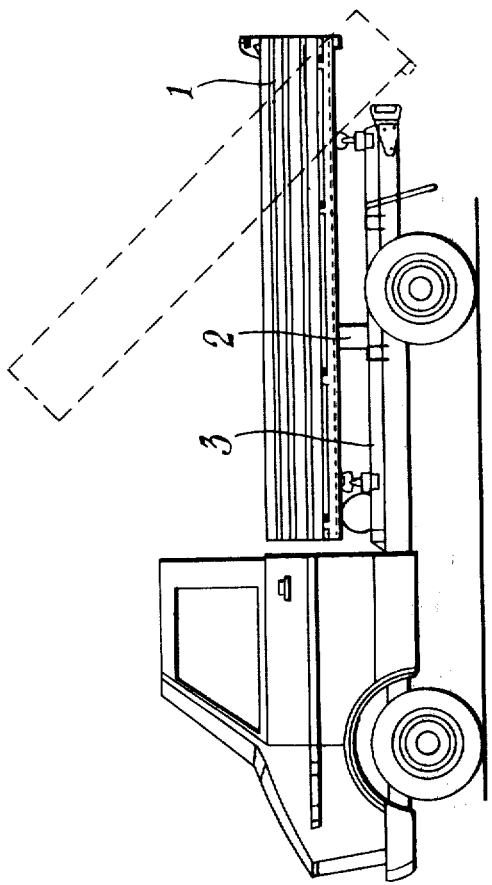
FIGS. 1 and 1A represent, respectively, a schematic side and rear view of a tipping body mounted on a truck.
Figure 2B:
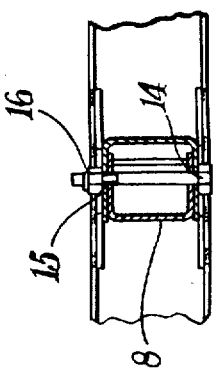
FIGS. 2A and 2B represent sections A—A and B—B of FIG. 2 on an enlarged scale.
Figure 2A:
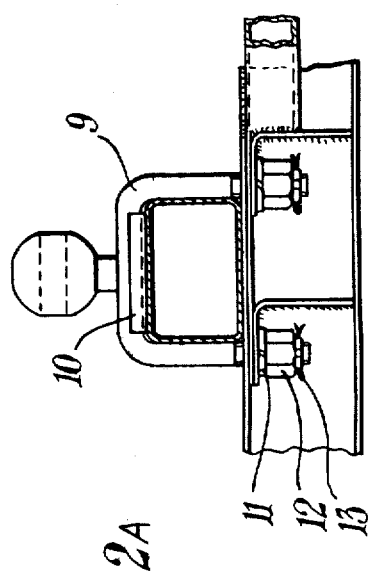
Figure 1A:
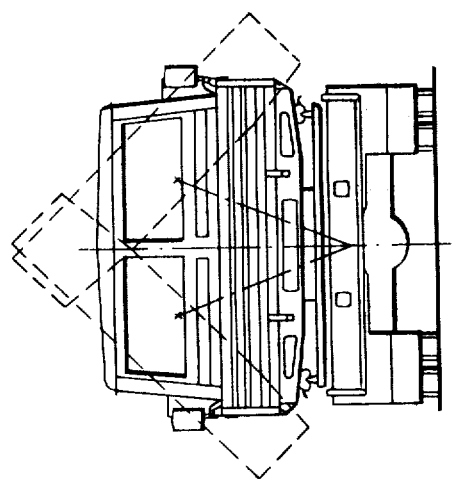

With reference to FIGS. 1 and 1A, numeral 1 indicates the tipping body actuated by a telescopic raising jack 2 and supported by the auxiliary modular frame according to the invention indicated in its entirety by numeral 3. In the illustrated example, the body 1 can be tipped at the rear and on the two sides, as indicated in dotted lines.

Figure 2:
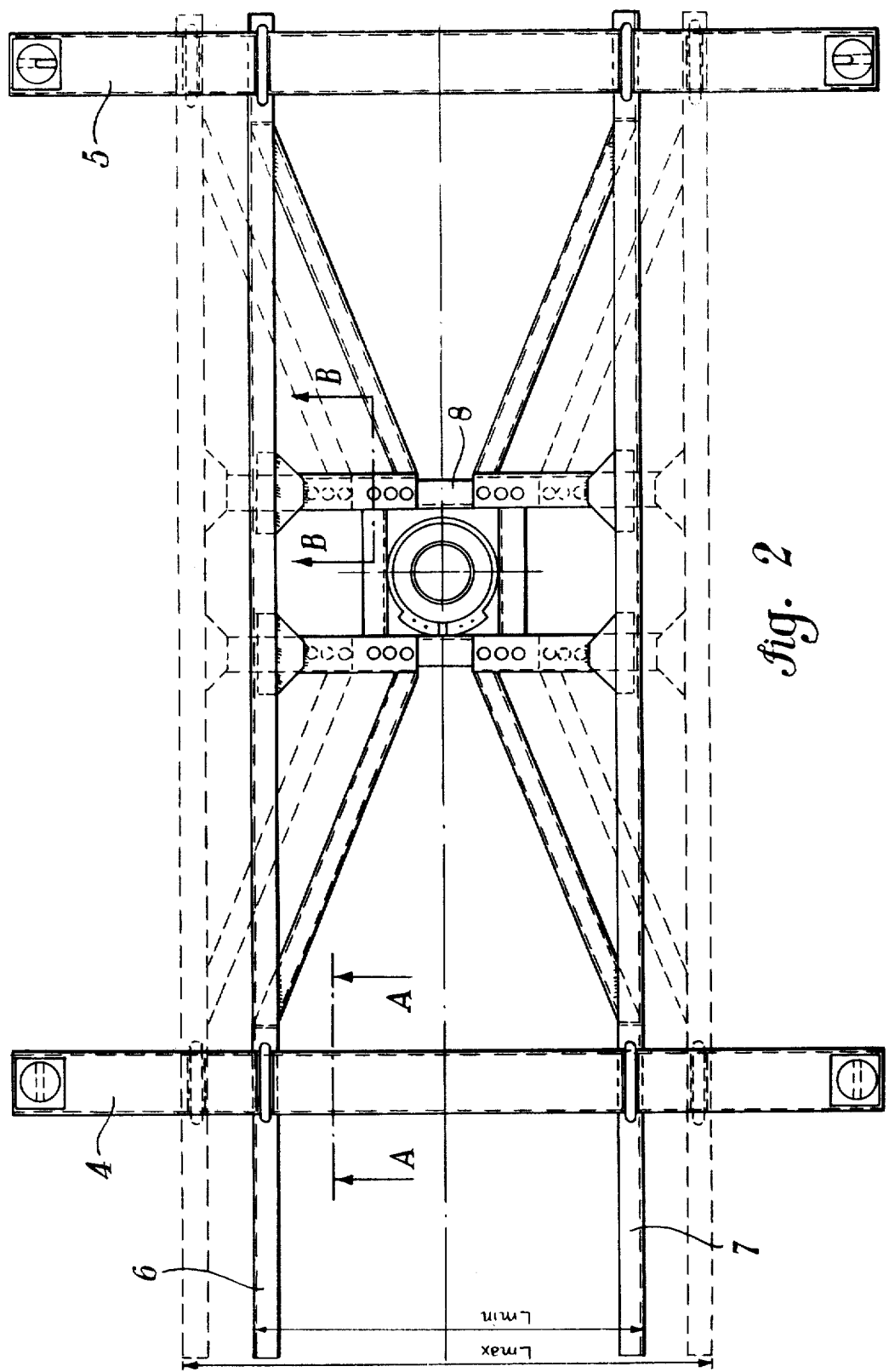
FIG. 2 is the plan view of the auxiliary modular frame.

In FIGS. 2 and 3, the auxiliary modular frame adjustable according to the invention is illustrated in detail. It comprises two cross members and hinging spherical joint arms 4 and 5 which serve as support for the body and as fulcrum for the tipping. Said arms rest on the upper surfaces of the side members 6 and 7 and are fixed by the bracket 9, the shim 10, the elastic washer 11, the self-locking notched nut 12 and the safety split pin 13.

The two side members, right and left, 6 and 7, are reinforced in the front and rear part by the angle members 18, and in the central part the two drilled half cross members 20 are welded, reinforced by the tubular diagonals 17 and by the gussets 19.

Numeral 18 indicates the whole of base for the telescopic jack which is composed of two drilled cross members 21 joint among them by the omega-shaped cap 22 and reinforced by the webs 24.

In the center, there is welded the lower spherical seat 23 for the rotation of the telescopic jack.

Fastening of the hinging spherical joint arms 4 and 5 is accomplished by means of threaded U-shaped bracket 9, associated with shim 10 which is located between the bracket 9 and the arms 4 and 5 for the purpose of avoiding deformations in the clamping. On the bracket 9, the elastic washer 11, the notched nut 12 and the safety split pin 13 are assembled.

Numerals 14, 15 and 16 indicate bolts for attaching the whole of the base 8 to the whole of the side members 6 and 7.

A pair of diaganal tubular reinforcing members 17 are welded on the angle member 18 and on the drilled half cross member 20 for contributing to the resistance and distributing the stresses on the side members.

At the ends of the diagonal tubular members 17, the reinforcing angle members 18 are welded, for the purpose of preventing deformation on the wing of the side members in the zone for attachment of the hinging spherical joint arms.

Reinforcing and connecting side member and the drilled cross members 20. The latter interiorly receive the cross members 21 of the whole of the base 8, and enable connection of the side members 6 and 7 to the desired center.

Numeral 22 indicates a pair of omega-shaped caps, which join the two cross members 21 on which the spherical seat for the rotation of the telescopic jack is welded.

The operation is as follows:

After having measured the distance between the side members of the original frame of the truck, the same distance is imposed on the auxiliary frame, by loosening threaded brackets 9, disassembling the bolts 14, 15, 16, and positioning the side members 6-7 at the desired distance, making run the latter with the fixing brackets on the hinging spherical joint arms 4, 5 and making run the half cross member 20 on the crossmembers 21. Then one proceeds again with the locking of the brackets 9 through the washers 11, the notch threaded nuts 12, and the split pin 12 and of the cross members 21 with the half crossmembers 20 by the bolts 14, 15, 16.

Once the auxiliary modular frame has been adjusted according to the determined dimensions, it is attached to the frame of the truck and linked the control cabin.

What is claimed is:

1. A modular frame for dump trucks having two parallel side members and two parallel cross members adjacent the end portions of said side members, comprising
   (a) two pairs of U-shaped half cross members, each pair being rigidly secured to each of said side members substantially at the central portion thereof;
   (b) a central cross unit carrying a base for a hoisting jack and adapted to be adjustably connected with said half cross members of each of said side members; and
   (c) disengageable fastening means for adjustably connecting said two cross members to the end portions of said side members.

2. A modular frame as claimed in claim 1, wherein said central cross unit consists of two U-shaped central members rigidly connected to one another by two transverse elements and bearing said base for said hoisting jack between said two transverse elements, said two U-shaped central members being provided at their end portions with a plurality of holes, corresponding to similar holes provided at the end portions of said half cross members, whereby by telescoping said U-shaped central members into said half cross members, the distance between said side members may be adjusted to a desired value, at which distance said two cross members are fastened to said side members by said disengageable fastening means.

3. A modular frame as claimed in claim 1, wherein said disengageable fastening means comprises a U-shaped bracket threaded at the ends of its legs and adapted to embrace said cross members, a shim abutting on said cross members and having two holes through which said legs of said bracket are inserted to enter into similar holes provided in said side members, and nuts screwed on said threaded ends of said legs for fastening said cross members to said side members at a desired distance therebetween.

* * * * *